(12) United States Patent
Miller et al.

(10) Patent No.: US 7,809,954 B2
(45) Date of Patent: Oct. 5, 2010

(54) BIOMETRIC CONTROL OF EQUIPMENT

(76) Inventors: Brian Scott Miller, 1306 Mt. Vernon Pl., Charleston, WV (US) 25314; Jack Vaughan, 333 Southpointe Dr., Charleston, WV (US) 25314; Oscar Allen Ladriere, Rt. 4, Box 137, Charleston, WV (US) 25312

( * ) Notice: Subject to any disclaimer, the term of this patent is extended or adjusted under 35 U.S.C. 154(b) by 932 days.

(21) Appl. No.: 10/546,090

(22) PCT Filed: Mar. 31, 2005

(86) PCT No.: PCT/US2005/010612
§ 371 (c)(1),
(2), (4) Date: Jan. 5, 2006

(87) PCT Pub. No.: WO2006/118555

PCT Pub. Date: Nov. 9, 2006

(65) Prior Publication Data
US 2007/0055888 A1  Mar. 8, 2007

(51) Int. Cl.
*G06F 21/00* (2006.01)
*G06F 21/02* (2006.01)
*G06F 21/06* (2006.01)

(52) U.S. Cl. .................. 713/186; 713/182; 713/168; 726/16; 726/19; 726/21; 137/8; 137/115.21; 137/115.22; 137/115.26; 137/486

(58) Field of Classification Search .................. None
See application file for complete search history.

(56) References Cited

U.S. PATENT DOCUMENTS

| | | | |
|---|---|---|---|
| 4,319,333 A | 3/1982 | Hedrick | |
| 4,731,730 A | 3/1988 | Hedrick et al. | |
| 5,415,551 A | 5/1995 | Semenza | |
| 5,711,456 A | 1/1998 | Bryant | |
| 5,719,950 A | 2/1998 | Osten et al. | |
| 5,957,148 A | 9/1999 | Sell | |
| 6,186,196 B1 | 2/2001 | Leigh et al. | |
| 6,229,908 B1 | 5/2001 | Edmonds, III et al. | |
| 6,324,650 B1 * | 11/2001 | Ogilvie | 726/2 |
| 6,324,840 B1 * | 12/2001 | Watkins | 60/396 |
| 6,327,376 B1 | 12/2001 | Harkin et al. | |
| 6,609,534 B1 | 8/2003 | Beaney et al. | |
| 6,788,928 B2 | 9/2004 | Kohinata et al. | |

(Continued)

FOREIGN PATENT DOCUMENTS

EP  1494164  1/2005

(Continued)

*Primary Examiner*—Syed A. Zia
(74) *Attorney, Agent, or Firm*—Gifford, Krass, Sprinkle, Anderson & Citkowski, P.C.; Douglas L. Wathen (57) ABSTRACT

An apparatus for allowing operation of equipment by an authorized operator comprises a biometric scanner 20 receiving a biometric input from an authorized operator, and transmitting an authorization signal as long as the biometric input is received from the authorized operator. The apparatus further includes an equipment control system 18 that allows the equipment to operate substantially only while the equipment control system receives the authorization signal from the biometric scanner 20, and that prevents the equipment from operating shortly after the authorization signal is no longer received from the biometric scanner.

6 Claims, 4 Drawing Sheets

U.S. PATENT DOCUMENTS

| | | |
|---|---|---|
| 6,799,726 B2 | 10/2004 | Stockhammer ............. 235/492 |
| 6,810,310 B1 | 10/2004 | McBain |
| 6,810,480 B1* | 10/2004 | Parker et al. ................ 713/186 |
| 6,836,556 B1 | 12/2004 | Bromba et al. |
| 7,272,456 B2* | 9/2007 | Farchmin et al. ............. 700/66 |
| 7,327,045 B2* | 2/2008 | Watkins ....................... 290/1 R |
| 2001/0026546 A1 | 10/2001 | Schieder et al. |
| 2001/0056546 A1* | 12/2001 | Ogilvie ....................... 713/200 |
| 2003/0032407 A1 | 2/2003 | Mages |
| 2003/0069648 A1* | 4/2003 | Douglas et al. ................ 700/2 |
| 2003/0174049 A1 | 9/2003 | Beigel et al. |
| 2004/0059923 A1* | 3/2004 | ShamRao ................... 713/186 |
| 2004/0148039 A1* | 7/2004 | Farchmin et al. ............... 700/79 |
| 2004/0156327 A1* | 8/2004 | Yankielun et al. ........... 370/310 |
| 2004/0264743 A1 | 12/2004 | Arnouse |
| 2005/0078006 A1* | 4/2005 | Hutchins et al. ............ 340/561 |
| 2006/0213982 A1 | 9/2006 | Cannon et al. |
| 2007/0055888 A1 | 3/2007 | Miller et al. |

FOREIGN PATENT DOCUMENTS

| | | |
|---|---|---|
| EP | 1494164 A2 | 1/2005 |
| WO | WO-2006/063392 A1 | 6/2006 |
| WO | WO-2007/019605 A1 | 2/2007 |

* cited by examiner

BIOMETRIC CONTROL OF EQUIPMENT

FIELD OF THE INVENTION

The invention relates to methods and apparatus for preventing operation of equipment by unauthorized persons.

BACKGROUND OF THE INVENTION

According to National Fire Protection Agency regulations covering aircraft refueling, a deadman control must be used with the valve that controls the flow of fuel to an aircraft, and deadman controls shall be designed to preclude defeating their intended purpose. Further, the fuelling operator should monitor the panel of the fuelling equipment and the aircraft control panel during pressure fuelling or should monitor the fill port during overwing fuelling. According to the regulations, use of any means that defeats the deadman control shall be prohibited. A deadman switch should be used with fuel flow control valves such as a hydrant pit valve, a tank outlet on a tank vehicle, a separate valve on the tank vehicle or on a hose nozzle for overwing service.

Under typical regulations, a deadman switch should be used when performing any pressure fueling or tender filling operation. Deadman switches are designed to safeguard against over filling circumstances or situations that may delay the suspension of fuel flow. Fuel flow stops when the deadman device is released. Ideally, a deadman switch should not be jammed or bypassed during any fuel transfer operation. Deadman switch types include the electromechanical deadman switch, pneumatic deadman switch (sometimes called the air deadman switch), and combination electromechanical/pneumatic types. The deadman switch is actuated, for example through being in the hands of the operator, during a refueling process.

However, a conventional equipment control system, such as a conventional deadman switch, provides no method of identifying the operator and so may be used by any person, even those not authorized or trained to use the equipment. Also, conventional equipment controls are susceptible to jamming or locking in an operating position. These conventional systems allow both authorized and non-authorized personnel to purposely jam existing deadman switches into an operating position.

There are also many other circumstances where an authorized person such as an authorized operator needs to be in proximity to the equipment or operation. These circumstances may include any hazardous operation (such as a fueling operation), operation of equipment, medical monitoring situations, operation of equipment requiring some kind of safety interlock system, and the like. Conventional equipment control methods do not attempt to identify an authorized operator.

SUMMARY OF THE INVENTION

An apparatus for allowing operation of equipment by an authorized operator comprises a biometric scanner receiving a biometric input from an authorized operator, and transmitting an authorization signal as long as the biometric input is received from the authorized operator. The apparatus further includes an equipment control system that allows the equipment to operate substantially only while the equipment control system receives the authorization signal from the biometric scanner, and that prevents the equipment from operating shortly after the authorization signal is no longer received from the biometric scanner.

A timing delay between the end of the authorization signal and the prevention of equipment operation ca be introduced according to the application. In fueling applications, the equipment control system may prevent the fueling equipment from operating within ten seconds or less, such as within five seconds, of the authorization signal being no longer received from the biometric scanner. In other applications, the timing delay may be longer, allowing an operator to provide biometric input at intervals. The intervals may correspond to typical required intervals between deadman switch operations.

The authorization signal may be a wireless signal, allowing the biometric scanner to be a portable device transmitting a wireless signal to the equipment control system. The biometric scanner may include a fingerprint reader or other biometric sensor. The biometric scanner further may further include a memory, the biometric scanner identifying the biometric input as being from the authorized operator by comparing the biometric input with stored biometric data in the memory.

Examples of the present invention can be used with, or replace, deadman switch based systems. For example, a signal can be provided to actuate a deadman switch as long as a biometric input is provided to the biometric scanner. Examples of the present invention include facing systems, such as airport fueling systems where actuation of a deadman switch is required to operate the fueling system.

A process for allowing operation of equipment by an authorized operator comprises receiving a biometric input from an operator, determining if the biometric input is from the authorized operator, transmitting an authorization signal while the biometric input is provided by the authorized operator, operating the equipment only while the authorization signal is received by an equipment control system, and disabling the equipment shortly after the authorization signal is no longer received by the equipment control system. The process may be a fueling process at an airport and disabling the equipment can occurs within ten seconds or less, such as within five seconds, of the authorization signal being no longer received by the equipment control system.

DETAILED DESCRIPTION OF THE INVENTION

An apparatus for equipment control allows operation of the equipment only while an authorized operator provides a biometric input to the control system. The control system can include a portable biometric scanner in the possession of the operator. Examples of the present invention include an apparatus that provides identification of authorized persons from a biometric input, and which prevents use of equipment if the operator is not continually identified as an authorized operator. Removal of the finger will cause the control system to shut the valve and stop fueling. The biometric fingerprint of the authorized operator is used to begin the fuelling process.

A biometric scanner can be used to allow operation of the controlled equipment. The biometric scanner may include a fingerprint reader and/or other biometric sensor. The operator places a finger on the fingerprint reader, and the fingerprint reader reads the fingerprint of the operator and compares this input fingerprint with fingerprints of authorized operators. Authorized fingerprints can be stored in a memory of the biometric scanner. Fingerprints can be deleted from the memory if, for example, the corresponding person is no longer an authorized operator. For example, fingerprints of those at have left the job, or have otherwise lost authorization, can be deleted. Hence, if an equipment operator is fired or leaves the job without notice, unauthorized use by the person can be prevented. Hence possibly preventing damage to the equipment and potentially catastrophic safety hazards.

Hence, an improved method for preventing the unauthorized use of equipment by an unauthorized operator includes providing a biometric scanner to an authorized operator, detecting whether the authorized operator is in possession of the scanner by receiving a biometric input from the operator, and only allowing the performance of an operation if the biometric scanner is in possession of the authorized operator.

In the field of airplane refueling, after placing the nose of a fuel pump into the adaptor of an aircraft regulations require that an operator actuate a handheld deadman switch in order to start pumping fuel into the aircraft. In this example, the controlled equipment is an aircraft fueling system. Hazards, such as over-fueling or under-fueling due to operation of equipment by an unauthorized person, can be avoided by only allowing the fueling system to operate if the operator provides a recognized biometric input.

An example apparatus according to the present invention includes a hand-held biometric scanner which transmits an authorization signal to a base station only as long as an authorized operator provides a recognized biometric input to the biometric scanner. The base station allows operation of the controlled equipment, for example by causing actuation of a deadman switch, only as long as the authorization signal is received from the scanner. Hence, operation of the controlled equipment may no longer be possible if any of the following occur: the scanner is handed to an unauthorized person; the scanner is no longer able to transmit the authorization signal to the base station (for example, the authorization signal may be a wireless signal, and the scanner might be out of range of wireless transmission to the base station); or the authorized person no longer provides the biometric input (for example, taking a finger off a fingerprint reader).

For example, if the biometric scanner includes a fingerprint reader, the fuel pumping system is operable only as long as an authorized fueling operator has a finger in contact with the fingerprint reader. This safety feature ensures the presence of the operator until the fueling operation is complete. Fingerprint authentication can therefore be used to better improve the current aircraft fueling method. Current refueling systems do not incorporate a true deadman device, the new biometric system will be fully compliant with the National Fire Protection Agency's Article 407.

In an example of the present invention, each fuelling truck has its own unique base station, and each base station responds to its own set of handheld biometric scanners used by the operators. The biometric scanners (which may be handheld remotes) used with the base station of one truck may be confined so that they cannot be used with another truck, therefore further lowering the chance of unauthorized use. For example, each truck base station may have a unique associated receiving frequency, or require a particular authorization code to be transmitted by an associated biometric scanner.

Figure 1:
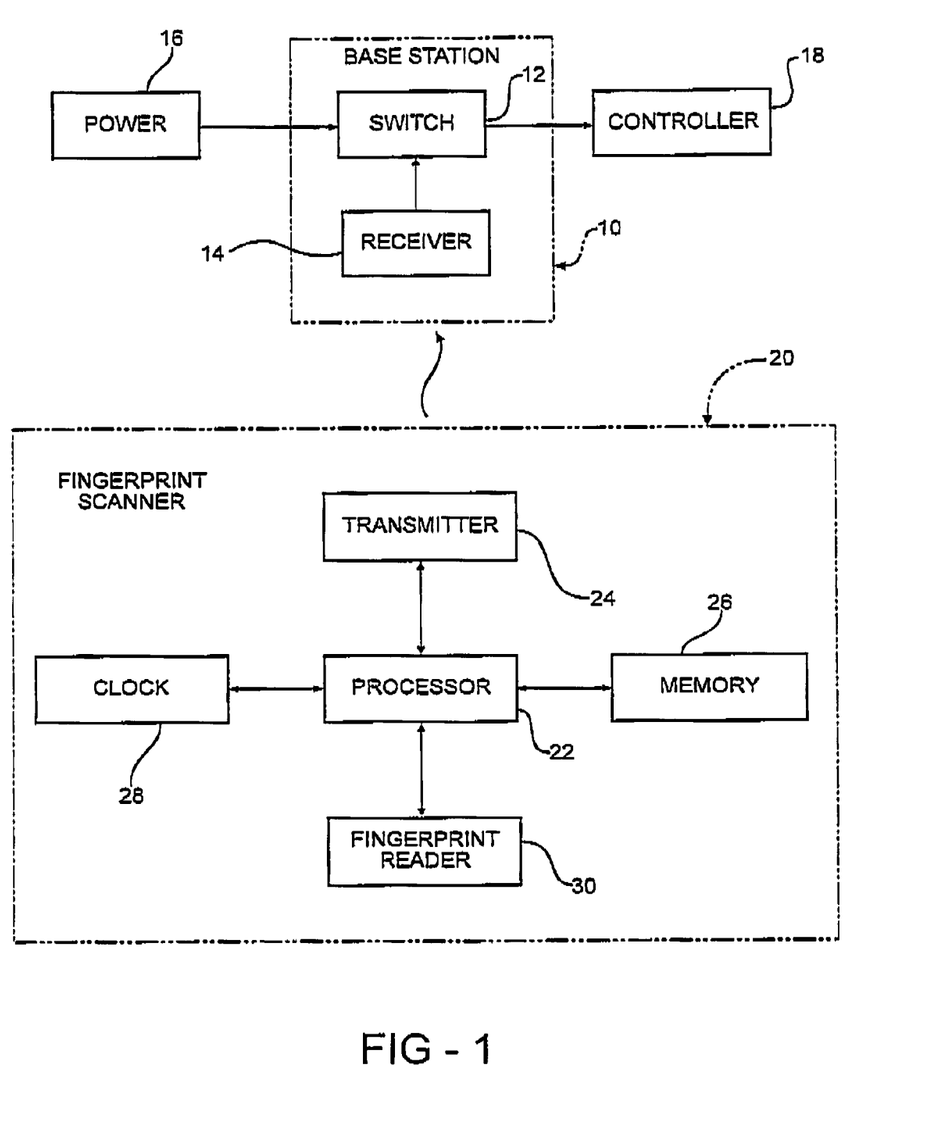
FIG. 1 is a schematic of a base station providing a signal to an equipment controller, the base station receiving a signal from a biometric scanner.

FIG. 1 shows a schematic of an example system according to an example of the invention. The system includes a base station 10 which comprises a switch circuit 12 and receiver 14. The switch receives electrical power from a power source 16 and when energized provides an electrical signal to equipment controller 18. The system also includes a biometric scanner 20, which comprises a processor 22, transmitter 24, memory 26, clock 28, and fingerprint reader 30.

An operator is in possession of the biometric scanner 20 and places a finger on fingerprint reader 30. The presence of the finger is detected, and the fingerprint is read and compared with stored fingerprint data in memory 26. If a match is made, the person is identified as an authorized operator of the system. The biometric scanner can be configured so that the authorized person must keep their finger on the fingerprint reader continuously, or substantially continuously (for example, with momentary breaks of a few seconds or less, for the system to operate.

The transmitter 24 then transmits an authorization signal to receiver 14 within the base station 10. When the receiver 14 receives the authorization signal, the switch 12 is energized, sending an electrical signal to the equipment controller. Equipment controlled by the controller operates, or can be operated, while the authorization signal is transmitted by the scanner.

The switch circuit 12 operates to send an electrical signal to the equipment contoller during times when the receiver 14 receives the authorization signal from transmitter 24. If the person removes their finger from the fingerprint reader 30, the authorization signal is terminated, and the switch 12 turns off, disabling any equipment controlled by the controller 18.

In this example, the base station 10 and equipment controller 18 (which may be a deadman switch) form an equipment control system that allows equipment operation so long as an authorization signal is received from the biometric scanner.

There may be a slight time delay between removing a finger from the fingerprint reader and turning off of the switch, so as to allow continuous operation of the equipment even if a finger is briefly removed from the fingerprint reader. The time delay between removing a finger from the reader 30, and turning off of any equipment can be fairly short, for example less than ten seconds. In aircraft refueling application, the time delay can be less than five seconds, such as approximately two seconds or less. The time delay can be provided by a suitable electrical circuit in the scanner, the base station, or the controller.

The biometric scanner 20 is preferably a portable device, such as a portable device configured as a key fob, handheld device, or other portable device. The biometric scanner can be a portable electronic device having additional functionality such as a cell-phone, PDA (personal digital assistant), vehicle remote keyless entry system (in which case, the biometric scanner may also provide a vehicle security feature by only allowing an authorized operator to open and/or use a vehicle), and the like.

The biometric scanner may be built in to a wearable object, for example having additional functionality, such as a wristband, glove (a fingerprint reader may be on the inside of the glove), eyeglass or safety goggles frame (which may include an iris scanner), hat (which may include a face recognition feature using a cap-mounted camera), footwear (which may include a pressure sensor or toe scanner), or other object.

The biometric scanner may also operate as an identity card, for example having an image of the authorized operator on the housing of the biometric scanner. The authorization signal from the biometric scanner may also be transmitted to other devices, such as restricted access entryways (gates, doors, and the like), allowing the person to pass through. The biometric scanner may also transmit a position signal when the biometric input is provided, allowing the position of the operator to be monitored.

The communications link between the transmitter 24 and the receiver 14 may be a wireless link, such as a radio link, so that the authorization signal is a radio signal. The authorization signal may also be provided by a permanent cable link (such as an electric cable or a fiber optic cable), optical signal (such as a laser), IR, or ultrasound signal. The authorization signal may be modulated. The signal modulation may, for example, convey an authorization code if an authorized operator is identified.

Figure 2:
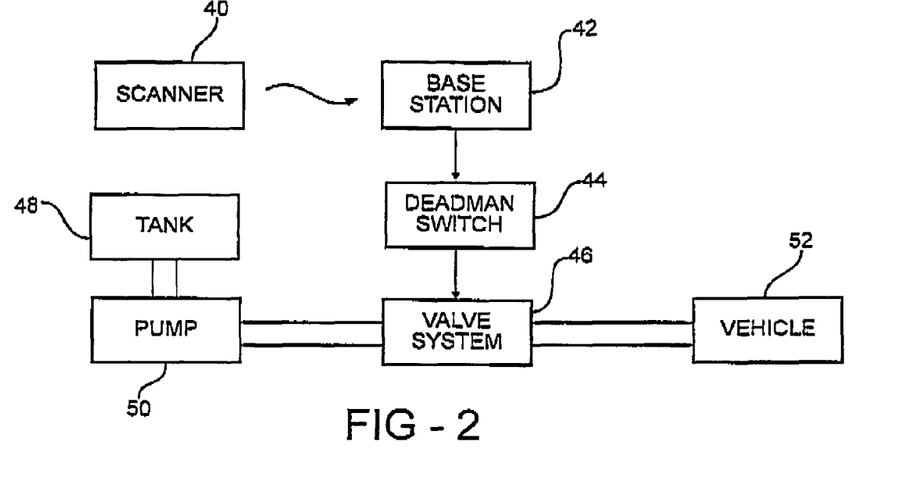
FIG. 2 is a schematic of an apparatus according to the present invention used in a fueling system.

FIG. 2 illustrates another configuration of an equipment control system, comprising biometric scanner 40, base station 42, deadman switch 44, valve system 46, fuel storage tank 48, pump 50, and vehicle 52 receiving fuel.

The biometric scanner 40 provides a wireless signal to the base station 42 when an authorized operator gives a recognized biometric input to the biometric scanner. Actuation of the deadman switch 44 is necessary to open valves within the valve system 46, allowing fuel to be pumped from the fuel storage tank 48 to the vehicle 52. The deadman switch actuates, enabling the valve system to allow fuel to pass from the fuel storage tank to the vehicle. For example, when the deadman switch receives an electrical signal from the base station, this may cause a valve or passage within the valve system to open. The electrical signal to the deadman valve is only provided when an authorization signal is received by the base station from the biometric scanner. Fuel can then be pumped by the pump from the storage tank to the vehicle. The fuel storage tank may be a fuel tanker, and the vehicle may be an airplane.

In this example, equipment control includes actuation of the dead switch. For example the deadman switch may be located within a fuel pump handle. An electrical deadman switch is actuated on receipt of a suitable electrical signal from the base station. For aircraft fueling, typically a 14 V electrical signal is necessary to actuate the deadman switch.

If the deadman switch is mechanical (such as a pneumatic deadman switch) an electrically powered actuator may be provided, configured to actuate the deadman switch on receiving an electrical signal from the base station. In this example, the base station provides the electrical signal necessary for operation of the fuel pump. The base station may also include an electrically powered actuator, and actuate the deadman switch through a mechanical, rather than electrical, coupling. In other examples, the base station and deadman switch can be integrated into a single equipment contoller, which itself may be part of the equipment to be controlled.

Figure 3:
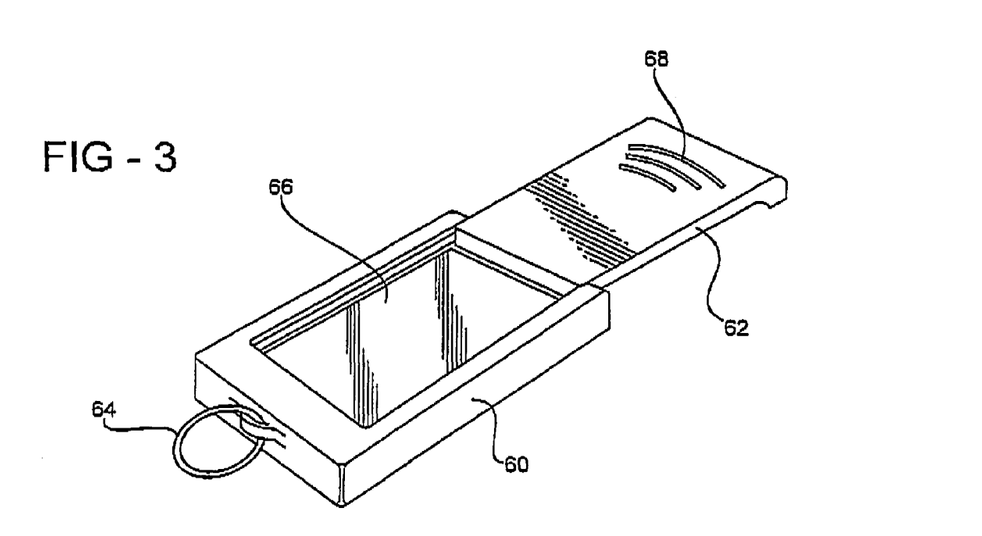
FIG. 3 shows an example of a biometric scanner which can be used in examples of the present invention.

FIG. 3 shows a view of a biometric scanner which can be used in examples of the present invention. The biometric scanner comprises housing 60, slidable cover 62 with an optional gripping surface 68, attachment ring 64, and fingerprint reader 66. An operator slides back the slidable cover and places a finger on the fingerprint reader 66. If the fingerprint is recognized as being that of an authorized operator, the biometric scanner transmits an authorization signal, in this case a wireless signal, to the base station. When not in use, the slidable cover can be pushed back to protect the fingerprint reader. A commercially available device manufactured by MicroLatch™ can be used for fingerprint identification, and adapted for use with examples of the present invention.

Figure 4:
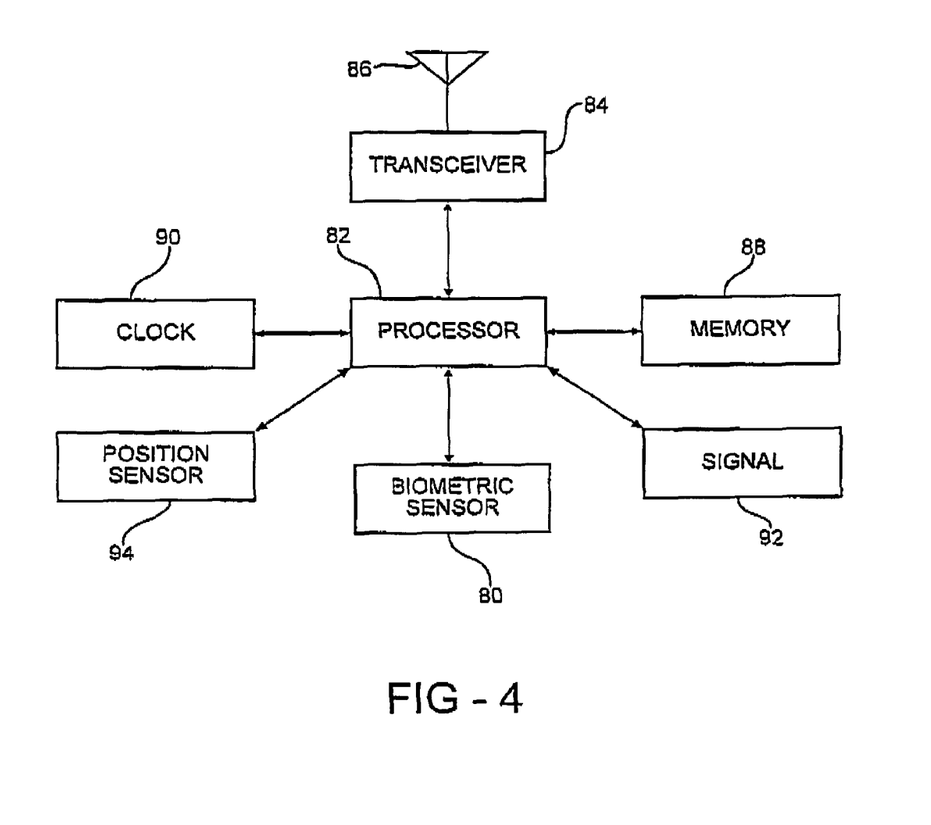
FIG. 4 is a schematic of an example biometric scanner according to the present invention.

FIG. 4 shows a schematic diagram for an example biometric scanner. The scanner comprises biometric sensor 80, processor 82, transceiver 84, antenna 86, memory 88, clock 90, signal 92, and position sensor 94.

The biometric sensor 80 may be a fingerprint reader, iris scanner, or other sensor providing an electrical signal correlated with a unique personal identifier. The biometric scanner may comprise one or more biometric sensors selected from: fingerprint reader (as used here, the term includes palm reader, toe-print reader, or other reader detecting skin topographies such as fingerprints); face recognition (the sensor may be an imaging sensor coupled to a face recognition software system); limb configuration sensor (for example, characterizing relative finger lengths, bone structure, vein structure and/or other configuration of band, arm, foot, legs, or other anatomical feature); eye scanner (such as a ret scanner or iris scanner); odor detector (including respiration component sensors); voice recognition sensor, gait sensor or other motion sensor (a characteristic notion may be sensed as a biometric input); DNA sequencer (for example receiving DNA as a biometric input); electromagnetic receiver (for example, receiving brainwaves, transmissions from body-implanted transmitters, or transponder system characterizing the transient response of a person to an electromagnetic pulse); or other biometric sensor.

The biometric sensor may also determine that the biometric input is being provided by a living person, for example by measuring an associated pulse or other physiological indication of life.

The signal 92 may be a signal activated when an authorized operator is identified. The signal may comprise an indicator lamp (such as a light-emitting diode) energized when an authorized operator is identified, a visual representation on a display, illumination of the biometric sensor, haptic signal, or other operator interface.

The position sensor 94, which is optional, may be a GPS sensor, cellphone-based triangulation device, or other device that provides an absolute position or a relative position relative to the base station.

If a biometric input corresponding to an authorized use is recognized, an authorization signal is transmitted using the transceiver and antenna. The biometric scanner may additionally receive signals from the base station. For example, the device may be activated after receiving an activation signal from the base station.

Figures 5, 6:
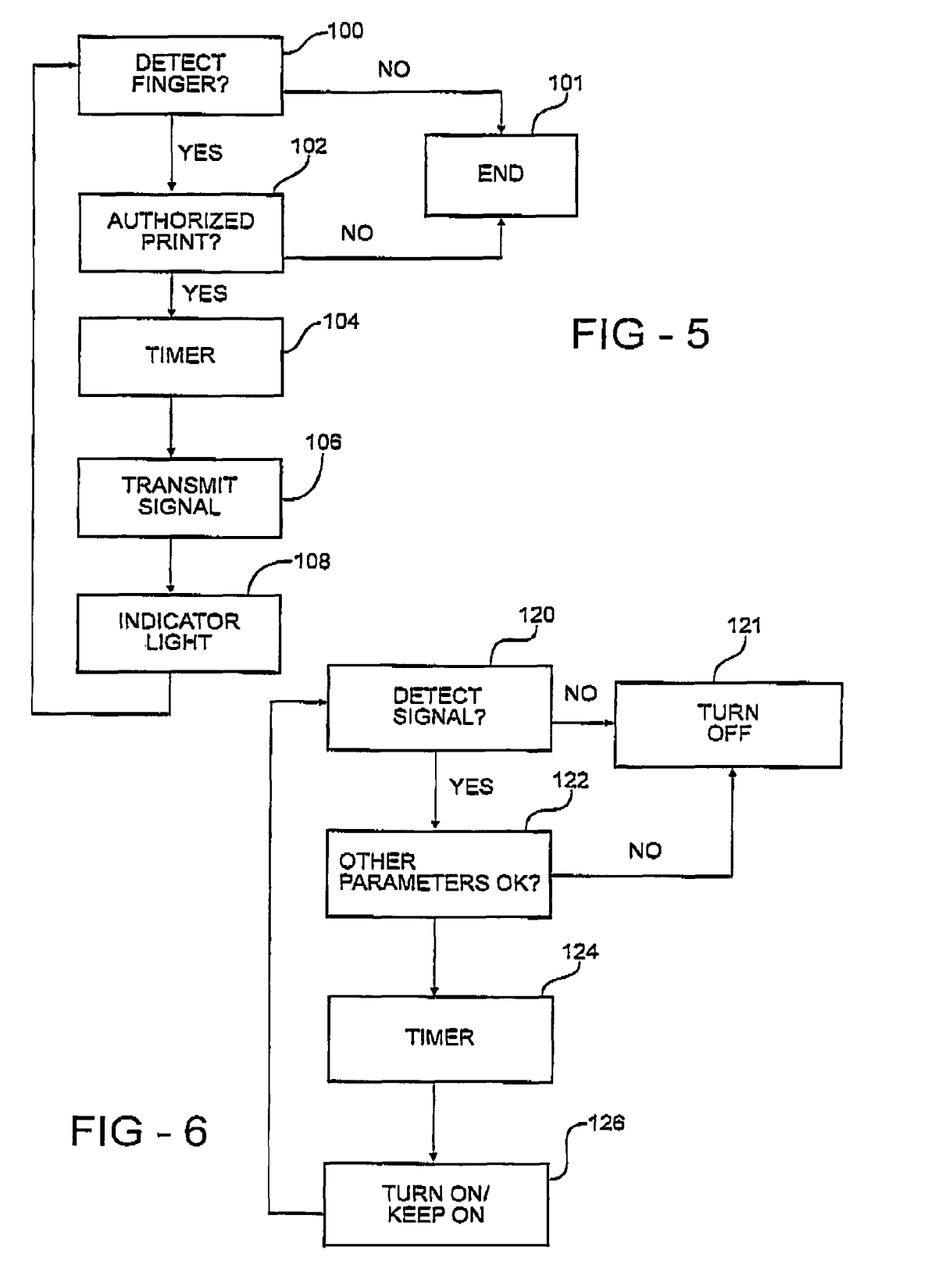
FIG. 5 is a flowchart showing a possible operation of a biometric scanner.
FIG. 6 is a flowchart showing a possible method of operation for a base station.

FIG. 5 shows a possible method of operation of a biometric scanner. The method of operation may be provided by a software program executed by a processor within the biometric scanner. In the example below, the biometric input is the placement of a portion of a finger on the fingerprint reader, a fingerprint reader then reading input fingerprint data from the finger.

Box 100 corresponds to detecting a finger on the fingerprint reader. If no finger is detected, the present process comes to an end. If a finger is detected, corresponding to the "yes" option on the figure, the fingerprint can then compared with authorized fingerprints.

Box 102 corresponds to determining if the fingerprint is that of an authorized operator. The input fingerprint may be compared, for example, to authorized fingerprints stored in a memory of the biometric scanner. Authorized fingerprints may also be stored at a remote location, such as in a computer database accessible by the scanner, or on the base station. Fingerprints may be reduced to numerical data to reduce data storage requirements, as is known in the art. Certain distances between typical fingerprint features may be measured, and convened into numerical parameters. If the fingerprint is not that of an authorized operator, corresponding to "no" on FIG. 5, the process comes to an end.

Box 104 corresponds to an optional timing delay. For example, if an authorized operator is detected, a reset pulse can be sent to a timer. If no reset pulse is received within a timing period, the timer signal terminates. If the tuner has a two second timing period, the timer signal terminates two seconds after the finger is removed. This allows continuous operation of controlled equipment with momentary removal of the finger from the fingerprint reader. The timing delay is optional, and analogous circuitry may be provided in the base station Box 106 corresponds to transmitting an authorization signal to the base station. The authorization signal is transmitted as long as a fingerprint of an authorized operator is detected (subject to any timing modifications as described above in relation to box 104). The transmission is started if the authorized operator is detected for the first time, or maintained if the fingerprint was previously detected.

Box 108 is optional, and corresponds to providing operator feedback, such as an indicator light, to the operator showing if authorized status is detected.

If a fingerprint is detected, but cannot be identified as an authorized fingerprint, the operator may be prompted to clean the finger, reposition the finger, or otherwise improve the characteristics of the input fingerprint.

The process cycles until either no authorized fingerprint is detected, or the fingerprint detected is not recognized as that of an authorized operator, in which case the process comes to an, end indicated by box 101. In practice the fingerprint reader will be sampled at intervals such as every second, to determine if a finger is present. The fingerprint reader may send a signal starting this process if a finger is detected. A finger may be detected by the presence of an input fingerprint or using, for example, a capacitive sensor responsive to touch pressure or electrostatic signals from the finger.

This method may be used with other types of biometric indicator, such as iris scans and the like. The indicator light 108 and timing delay 104 are optional and can be omitted. Similarly, the authorization step may in some examples be omitted. It may be sufficient that any person is present for transmission of a signal in box 104.

In other examples, the biometric scanner transmits biometric data to the base station, and the base station identifies the biometric data as being from an authorized operator. In this example, the authorization signal transmitted by the biometric scanner includes biometric data. The authorization signal is only transmitted while an authorized operator provides a biometric input, as if a non-authorized person provides the biometric input the transmitted signal cannot contain the necessary biometric data, and hence cannot act as an authorization signal.

FIG. 6 shows a schematic of a possible method of operation of a base station.

Box 120 corresponds to detecting a signal from the biometric scanner. If no signal is detected, a controller in communication with the base station is turned off. The base station may operate directly as the equipment controller, and may be part of the equipment.

Box 122 is optional, and corresponds to checking that additional required parameters are within acceptable ranges when an authorization signal is detected. Additional parameters may include operating temperature, location of the operator, provision of additional authorization codes, provision of billing or payment information, fuel pressure (for refueling applications), time, other ambient conditions, or other parameters that are required to be within a certain range for the operation to proceed.

Box 124 corresponds to an optional timing delay, such as discussed above in relation to FIG. 5.

Box 126 corresponds to turning or keeping on an equipment controller, or the equipment itself. This may comprise provision of power to equipment, or an electrical signal to a deadman switch, or other switching system.

Box 121 is reached if no authorization signal is received, or if additional parameters are outside of acceptable limits, and corresponds to deactivating an equipment controller. This may correspond to shutting off the fuel supply to an airplane, turning off equipment, or otherwise stopping an operation that requires the presence of an authorized person.

The base station may provide an operation signal while the authorization signal is received from the biometric scanner. In other examples, the base station may provide a turn-on signal when the authorization signal is initially received, and a turn-off signal when the authorization signal is no longer received, or has not been received for a predetermined liming delay.

Examples of the present invention include improved aircraft fueling systems. In an illustrative example, an operator is provided with a biometric-scanner including a wireless matter, which transmits an authorization signal to a base station when a biometric input is received. The base station receives electrical power from a vehicle battery, and if an authorization signal is received from the biometric scanner, the base station provides an electrical signal to the handle input of the deadman switch of a fuel handle. In this example, the base station includes a wireless receiver, possibly a wireless transceiver, and receives typically twelve volts from a vehicle battery as an input, and provides the fourteen volts output that is typically required to actuate a deadman switch, the electrical signal being directed to a handle input inside the refueling vehicle.

The biometric scanner can be a fingerprint reader in a portable device, the biometric scanner also including a dedicated power supply in the form of one or more batteries, and a wireless transmitter to transmit the authorization code. The biometric scanner can be in wireless communication with the base station. The base station can be located in the cabin of a refueling vehicle where it receives an input voltage from the vehicle battery. When an authorized person puts a finger on the fingerprint reader, the scanner authenticates the authorization of the operator, sends a authorization signal to the base station, and sends an output voltage of fourteen volts to the deadman handle input in the vehicle cabin. This example is particularly useful in an improved aircraft refueling system. Fuel flow can then be provided from the refueling vehicle to the aircraft. The fourteen volts output is provided as long as a finger of an authorized operator is on the fingerprint reader. As soon as the finger is removed from the scanner, the output voltage falls to zero, the deadman switch in the fueling handle no longer receives the required fourteen volts, and the fuel flow to the aircraft is shut off.

In examples of the present invention, the biometric scanner may have low power (less than one watt, to avoid sparking hazards), a working distance of less than 50 feet, may have multiple frequencies for multiple authorized operators (such as fuel vehicle operators) such as a frequency of 300 MHz with 256 identifications. Since the wireless devices use such low wattage and frequency ranges, no licensing requirements are necessary. The biometric scanner can be handheld, and may use a rechargeable or long-life battery as a dedicated power supply. Different wireless modulation patterns can also be used to differentiate different biometric scanners.

In fueling applications, the biometric scanner should not generate any spark or similar combustion danger. The fueling process can have a shutoff time of less than approximately two seconds after the recognized biometric input terminates (for example, a finger removed from a fingerprint reader). The biometric scanner can provide a reasonably quick authentication of the operator, and can operate under both low and high temperatures typically found in an outdoor environment. The surface of the fingerprint reader may be heated to remove condensation or ice.

The biometric scanner in the possession of the operator may have a wireless communication to the equipment controller. In other examples, the scanner may be built in to a base station, deadman switch, or other equipment control apparatus. In other examples, the base station and controller may be integrated into a single device, or the equipment may include the function of the base station, for example having a radio receiver requiring an authorization signal before the equipment can operate. The base station may receive authorization signals from one or more biometric scanners, may only respond to a single biometric scanner, and may have alternative ways of providing an authorization signal, such as keying in an identification code or holding down a switch.

In examples of the present invention the biometric scanner may be the dimensions of a garage door opener, and may be similarly clipped to a skin visor of a vehicle. The biometric scanner provides a wireless or authorization signal when a biometric input is received from an authorized operator, for example when the finger of an authorized operator is on the fingerprint reader, and no longer provides the authorization signal after the finger is removed.

A suitable biometric scanner having a fingerprint reader may be adapted from commercially available designs, such as the fingerprint scanner of MicroLatch™, or as described in U.S. Patent Application Publication No. 2003/0032407 to Mages. The biometric scanner may have an internal antenna, external antenna protruding from its housing, or may connect to a longer antenna, for example in a vehicle.

Airport fueling regulations generally require that an aircraft fueling system has a deadman switch. Examples of the present invention go beyond the safety requirements of such regulations by allowing authentication of the operator.

Furthermore, in examples of the present invention, the biometric scanner is portable, enhancing operator mobility to improve process monitoring. In airplane fueling applications, the operator can move around, for example, to monitor the panel of fueling equipment, aircraft control panel during pressure fueling, and also can monitor fill ports during over-wing fueling. Hence, the operator need not be restricted to any fixed mechanical device.

In an example of the present invention, the operator is not required to stand depressing a mechanical switch as in certain conventional systems. Examples of the present invention provide all of the benefits of a deadman fueling system, while adding authentication of the operator identity, and allowing the operator mobility to investigate any potential safety hazards. The biometric input may not require any effort by the operator. For example, the operator may just rest a palm or finger onto a fingerprint reader. In other examples, the operator stands or sits where other biometric input can be collected, for example by an imaging sensor (for face recognition), or iris or metal scanner.

Biometric scanners can be built in to vehicles or other equipment. For example, a steering wheel or other surface may include a fingerprint reader. Image sensors may be built into the vehicle cabin.

The system can be used with any kind of fuel control valve, such as a hydrant pit valve, at the tank outlet on a tank vehicle, on a separate valve of the tank vehicle, and on a hose nozzle of an over-wing servicing system.

The fingerprint authentication requirement also makes it difficult to defeat the deadman switch feature. Conventional mechanical controls or interlocks can be jammed open using pieces of metal or taped open or otherwise permanently opened without the requirement of an operator being present. This can cause a very serious safety hazard. Also, conventional deadman switches can be successfully operated by any parson, whatever their relationship to the owner of the equipment. However, with the example improved apparatus described herein a biometric scanner can accurately detect the presence of an authorized operator.

The biometric scanner may also have a pulse sensor, or similar, so that, for example, a fingerprint cannot be transferred to the surface of the fingerprint reader using an adhesive tape, silicone mold, dismembered finger, or similar method.

An example biometric scanner may be in the form of a wireless transmitting portable device having a fingerprint reader, the scanner possibly having the size of a key fob. For example, the wireless transmission of a biometric scanner may operate at approximately 433.92 MHz, can be SAW resonator locked, use AM ASK transmission modulation, Keeloq™ code hopping technology, and have a 50 foot maximum range. All parameters may be variable according to the desired application and performance.

An example fingerprint reader which can be used in a biometric scanner is a Touchip™ fingerprint reader, which typically allows up to one million reads and withstands up to 15 kV air discharge onto the sensor surface. This fingerprint reader has a false acceptance rate of typically 0.01 percent. Other fingerprint readers can be used.

The biometric scanner may include one or more biometric sensors to determine if an operator is an authorized operator that is permitted to operate equipment. Biometric sensors may scan or otherwise analyze a fingerprint, toe print, exhalation components, heartbeat (including EKG signal), iris patterns, operator weight (for example standing on a sensor, the sensor detecting natural fluctuations of a standing person due to muscular contractions), electromagnetic field detection including brain wave detection, and the like.

Communication between the biometric scanner and the base station may take the form of radio frequency electromagnetic radiation, optical, IR, or other electromagnetic radiation. The communication may also be non-wireless, for example an electrical cable or fiber optic cable. The radio communication may be AM or FM modulated; similarly other electromagnetic links may be modulated, for example an infrared link may be modulated.

Examples of the other applications include fueling of vehicles other than aircraft, recognition of an operator and automatic debit for payment, and the like. For example, an automobile fueling system may comprise a fuel pump that dispenses fuel on receipt of an identifying code provided by a biometric scanner. The person associated with the identifying code can then be automatically billed for the fuel purchased, in a similar manner to use of a bank debit card.

A biometric scanner, such as a scanner including a fingerprint reader, may be included into an improved gas pump handle, for example to only allow the gas pump to be used by an authorized person, or for automatic identification and billing of the person using the gas pump. The pump may be mechanically latched on as long as a finger is placed on a fingerprint reader. The fingerprint reader may be part of the pump handle, otherwise part of the pump assembly, or a portable unit.

In examples of the present invention, repetitive strain injuries caused by the need to physically hold down a lever of a deadman switch or other interlock can be avoided. In examples of the present invention a person only need contact a finger onto a fingerprint render. The fingerprint reader may be adhered to a person's finger, or the biometric scanner may be mechanically attached to a person's hand, for example using a strap. In other examples, a person need only td where their face can be recognized by a face recognition system.

Multiple biometric scanners may be used, for example a first scanner for an authorized operator, and a second scanner for a fuel purchaser, airplane pilot, or other vehicle operator. Security can be increased by requiring multiple authorized biometric inputs.

The biometric scanner may also include a position sensor, for example, which provides information on the relative proximity of the operator to the base station. This can be used in an improved safety interlock system, in which an operator his to be a certain distance away from a dangerous piece of equipment. Also, it can be used to ensure that a person is close enough to a piece of equipment, such as a fuel pump, so that the person may deal with any dangerous situations quickly.

The biometric scanner can be included as part of another portable electrical device, such as a cell phone, vehicle operation device such as an automatic unlocker, PDA (personal digital assistant), or other electronic device that may be conveniently carried by the operator.

Examples of the present invention also prevent an authorized operator from getting a non-authorized person, such as an unskilled colleague, to fill in for them while the authorized operator leaves the proximity of a dangerous process such as airplane refueling, or operation of equipment.

In other examples, it may only be necessary for a person (not any particular person) to be present. The biometric scanner may provide an authorization code so long as it receives a biometric input from a person, but need not verify that the received biometric input is from an authorized person. For example, an input fingerprint can be identified as being provided by a living human, without identification.

Stored biometric data used for identification may be set to expire after a certain time period, such as a week, year, rental period of the equipment, or other predetermined. The biometric scanner may include OPS circuitry or other position-identifying circuitry, allowing the location of the authorized operator to be tracked. The scanner may it a location signal at intervals or continuously, or only when the authorization signal is transmitted.

The invention is not restricted to the illustrative examples described above. Examples are not intended as limitations on the scope of the invention. Methods, apparatus, compositions, and the like described herein are exemplary and not intended as limitations on the scope of the invention. Changes there and other uses mill occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference.

Having described our invention, we claim:

1. A biometrically actuated refueling system for an aircraft, wherein a flow of fuel is enabled only when a biometric input from an authorized user is continuously received, the system comprising:
   a deadman switch with a biometric based controller and receiver, the deadman switch controlling the flow of fuel from a fuel source to an airplane; and
   a biometric scanner and transmitter having a biometric input device for receiving a biometric input from a user and a position sensor for determining a proximity of the transmitter to the receiver, the transmitter operable to transmit a signal to the deadman switch receiver;
   the biometric scanner and transmitter continuously transmitting an authorization signal only when an authorized user continuously provides a biometric input to the biometric input device, the biometric scanner and transmitter ceasing to transmit the authorization signal when a biometric input corresponding to the authorized user is not continuously provided;
   the deadman switch allowing the flow of fuel only when the authorization signal corresponding to the authorized user is continuously received from the biometric scanner and transmitter and only when the proximity is within a predetermined range, the deadman switch ceasing the flow of fuel when the authorization signal corresponding to the authorized operator is no longer continuously received.

2. The biometrically secured refueling system of claim 1, wherein the deadman switch ceases the flow of fuel within ten seconds of when the authorization signal corresponding to the authorized operator is no longer being received.

3. The biometrically secured refueling system of claim 1, wherein the biometric scanner includes a fingerprint reader, the biometric input being an input fingerprint.

4. The biometrically secured refueling system of claim 1, wherein the biometric scanner and transmitter further includes a memory, the biometric scanner and transmitter identifying the biometric input as being from an authorized operator by comparing the biometric input with stored biometric data in the memory.

5. The biometrically secured refueling system of claim 1, wherein the deadman switch is an electrical deadman switch actuated by an electrical signal, the electrical signal being provided while the receiver continuously receives the authorization signal.

6. A method of biometrically actuating refueling for an aircraft, such that a flow of fuel is enabled only when a biometric input from an authorized user is continuously received, the method comprising:
   providing a deadman switch with a biometric based controller and an integrated receiver, the deadman switch operable to control the flow of fuel from a fuel source to an airplane;
   providing a biometric scanner and transmitter having a biometric input device for receiving a biometric input from a user and a position sensor for determining a proximity of the transmitter to the receiver, the transmitter operable to transmit a signal to the deadman switch receiver;
   receiving a biometric input from an authorized user using the biometric input device;
   continuously transmitting an authorization signal from the biometric scanner and transmitter to the deadman switch receiver only when an authorized user continuously provides a biometric input to the biometric input device
   allowing the flow of fuel through the deadman switch only when the authorization signal corresponding to the authorized user is continuously received from the biometric scanner and transmitter and only when the proximity is within a predetermined range, the deadman switch ceasing the flow of fuel when the authorization signal corresponding to the authorized user is no longer continuously received.

* * * * *

UNITED STATES PATENT AND TRADEMARK OFFICE
CERTIFICATE OF CORRECTION

| | | |
|---|---|---|
| PATENT NO. | : 7,809,954 B2 | Page 1 of 1 |
| APPLICATION NO. | : 10/546090 | |
| DATED | : October 5, 2010 | |
| INVENTOR(S) | : Brian Scott Miller et al. | |

It is certified that error appears in the above-identified patent and that said Letters Patent is hereby corrected as shown below:

At column 2, line number 2, the word ca should be can.

At column 5, line number 38, the word dead should be deadman.

At column 6, line number 67, the word convened should be converted.

Signed and Sealed this
Twenty-first Day of June, 2011

David J. Kappos
*Director of the United States Patent and Trademark Office*